United States Patent [19]

Kamata et al.

[11] Patent Number: 4,824,207
[45] Date of Patent: Apr. 25, 1989

[54] LENS BARREL

[75] Inventors: Shigeru Kamata, Tokyo; Hidefumi Notagashira, Yokohama, both of Japan

[73] Assignee: Canon Kabushiki Kaisha, Tokyo, Japan

[21] Appl. No.: 48,829

[22] Filed: May 12, 1987

[30] Foreign Application Priority Data

May 22, 1986 [JP]  Japan ............................. 61-77294[U]

[51] Int. Cl.⁴ .............................................. G02B 7/02
[52] U.S. Cl. .................................... 350/255; 350/429; 350/257; 354/400
[58] Field of Search ....................... 350/255, 257, 429; 354/195.1, 195.12, 195.11, 195.13, 400, 402, 403, 409

[56] References Cited

U.S. PATENT DOCUMENTS

| | | | |
|---|---|---|---|
| 4,359,276 | 11/1982 | Tomori ................................ | 354/400 |
| 4,416,526 | 11/1983 | Tomori et al. .................. | 354/195.12 |
| 4,472,032 | 9/1984 | Kamata et al. ...................... | 350/429 |
| 4,527,879 | 7/1985 | Hosoe et al. ..................... | 354/195.1 |

FOREIGN PATENT DOCUMENTS

56-165124  12/1981  Japan .

Primary Examiner—John K. Corbin
Assistant Examiner—Loha Ben
Attorney, Agent, or Firm—Fitzpatrick, Cella, Harper & Scinto

[57] ABSTRACT

A lens barrel having a fixed outer tube, a distance scale window formed in the outer peripheral surface of the fixed outer tube, a focusing ring which is disposed inside of the fixed outer tube and which is capable of moving in the direction of the optical axis and rotatable about the same, a focusing mechanism for moving the focusing ring in the axial and peripheral directions, a distance scale ring facing the inner periphery of the distance scale window and supported such as to be only rotatable about the optical axis, the distance scale ring having distance scale marks formed on its outer peripheral surface, and an interconnecting mechanism for interconnecting the focusing ring with the distance scale ring. The interconnecting mechanism turns the distance scale ring in response to the turning movement of the focusing ring about the optical axis. Simultaneously, the focusing ring moves in the direction of the optical axis without axially moving the distance scale ring.

10 Claims, 1 Drawing Sheet

LENS BARREL

BACKGROUND OF THE INVENTION

1. Field of the Invention

This invention relates to a distance indicating mechanism for a lens barrel.

2. Description of the Prior Art

Lens assemblies with autofocusing mechanisms which have been previously known have a fixed outer tube mounted on the camera body and a focusing ring which is accommodated in the fixed outer tube and which moves in the axial direction when turned by a motor, thereby forming a construction in which a distance scale mark positioned in the outer peripheral surface of the focusing ring appears in an indication window formed in a peripheral wall of the fixed outer tube. Since, in the distance scale indicating construction of this type of autofocusing lens assembly, the distance scale is formed on the outer periphery of the focusing ring, it is necessary to increase the dimension of the indication window in the axial direction of the fixed outer tube so that any scale mark will appear in the indication window even when the scale moves to a great extent with the movement of the focusing ring.

In the conventional autofocusing lens assembly having this type of distance scale indicating construction, it is not easy to read the distance scale because it moves in the axial direction below the indication window. Moreover, there is a possibility of a component part such as a glass part mounted in the indication window being damaged or of the mechanical stiffness of the fixed outer tube being reduced as a result of the size of the indication window being excessively large compared with that of the focusing ring.

SUMMARY OF THE INVENTION

It is therefore an object of the present invention to overcome the disadvantages of conventional autofocusing lens assemblies.

It is a further object of the present invention to provide a lens assembly having a distance scale that is easy to read, that reduces the likelihood of damage to components of the assembly, and that does not reduce the mechanical stiffness of the fixed outer tube.

The present invention which achieves these objectives relates to a lens barrel having a distance scale indicating construction in which the distance scale is not moved in the direction of the optical axis of the lens regardless of the distance through which the focusing lens moves.

To this end, the present invention provides a lens barrel having: a fixed outer tube; an indication window arranged in the outer peripheral surface of the fixed outer tube; a focusing ring facing the inner periphery of the fixed outer tube, the focusing ring being supported such as to be movable in the direction of an optical axis and rotatable about the optical axis; a focusing means for moving the focusing ring in the direction of the optical axis while rotating the focusing ring about the optical axis; a distance scale ring facing the inner periphery of the indication window and supported such as to be only rotatable about the optical axis, the distance scale ring having distance scale marks formed on its outer peripheral surface; and an interconnecting mechanism interconnecting the focusing ring with the distance scale ring, the interconnecting mechanism being constructed and arranged to rotate the distance scale ring in response to the rotation of the focusing ring about the optical axis, the focusing ring being capable of moving in the direction of the optical axis without moving the distance scale ring in the direction of the optical axis.

DESCRIPTION OF THE PREFERRED EMBODIMENT

The present invention will be described below with respect to a preferred embodiment thereof which is a lens barrel of a type in which a front element of a lens assembly is moved forward while a rear element is moved backward so as to reduce the picture-taking magnification, and in which focusing is effected by moving the front element.

Figure 1:
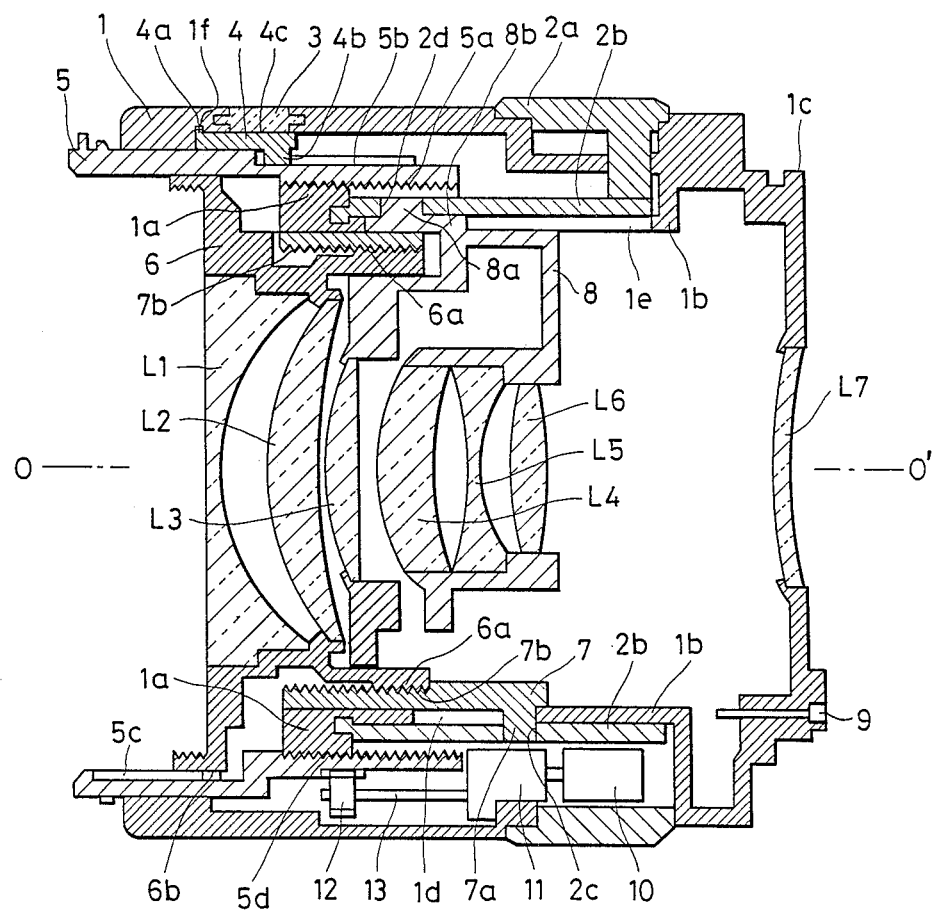
FIG. 1 is a longitudinal cross-sectional view of a lens barrel which represents an embodiment of the present invention.

As shown in FIG. 1, a fixed outer tube 1 is integrally formed together with a fixed inner tube 1b disposed inside the outer tube 1. The fixed outer tube 1 and the fixed inner tube 1b constitute the body of a lens barrel having a dual-tube type construction. A mounting click 1c for mounting the fixed outer tube 1 on the mount of a camera body (not shown) is formed at the rear end of the fixed outer tube 1, and a lens $L_7$ is attached to the outer tube 1 at this portion. The fixed outer tube 1 has a channel which is formed in the outer peripheral surface of the outer tube 1 in the vicinity of the rear end thereof over the entire circumference thereof, and a zoom operation ring 2a which is turned by manual operation is disposed in this channel. The fixed outer tube 1 also has an opening (or hole) which is formed in the vicinity of the front end of the outer tube 1 such as to extend in the circumferential direction and to which a distance scale indication window 3 made of transparent material is attached. A scale ring 4, which turns and slides on the fixed outer tube 1, is disposed such as to face an inner peripheral surface of the fixed outer tube 1 in a position corresponding to the distance scale indication window 3. A distance scale 4c of a known type is formed in the outer peripheral surface of the scale ring 4 such as to be seen through the distance scale indication window 3. A projection 4a, which is formed on the outer peripheral surface of the scale ring 4, is inserted into a circumferential groove 1f formed in the inner peripheral surface of the fixed outer tube 1 so that the scale ring 4 is capable of turning relative to the fixed outer tube 1, though not being capable of moving in the direction of an optical axis O—O' of lenses $L_1$–$L_7$ (hereinafter referred to as "axial direction") relative to the fixed outer tube 1. A projecting portion 4b is formed on the inner peripheral surface of the scale ring 4 and is inserted into an axial groove 5b formed in the outer peripheral surface of a focusing ring 5, which is described later. Hence, the focusing ring 5 is capable of turning the scale ring 4 but is not capable of moving the ring 4 in the axial direction. In other words, as the focusing ring 5 turns and moves in the axial direction, the scale ring 4 turns in association therewith while being constantly maintained at the home position without moving in the axial direction.

In the annular space between the inner peripheral surface of the fixed outer tube 1 and the outer surface of the inner fixed tube 1b is disposed a tubular member 2b, which is integral with the zoom operation ring 2a, and other members including the focusing ring 5, a gear 12 for driving and turning the focusing ring 5, a driving shaft 13, a speed reduction mechanism 11 (consisting of a plurality of gears), an autofocusing motor 10, and so forth. The speed reduction mechanism 11 and the motor 10 are fixed on the inner peripheral surface of the fixed outer tube 1.

Two axial slits 1d and 1e are formed through the fixed inner tube 1b in the peripheral surfaces thereof, and a projecting portion 7a of a lens moving ring 7, disposed inside the fixed inner tube 1b, and a portion 8b of a rear lens group holding frame 8 are respectively fitted into the slits 1d and 1e so that the lens moving ring 7 and the holding frame 8 can be moved in the opposite directions along the optical axis.

The lens moving ring 7 is a member for moving a front lens group holding frame 6 which is adapted for holding a group of front lenses $L_1$ and $L_2$. The lens moving ring 7 is screwed at its threaded portion 7b onto a threaded portion 6a formed in the outer peripheral surface of the front lens holding frame 6 and engages with the tubular member 2b of the zoom operation ring 2a. The ring 7 engages the tubular member 2b of the zoom operation ring 2a in such a manner that the ring 7 is prevented from moving in the axial direction of optical axis O—O' in response to the rotation of the frame 6 due to the rotation of a focusing ring 5 as discussed below. However, the ring 7 can move in the axial direction in response to the rotation of the zoom ring 2a, as noted above.

The rear lens holding frame 8 is a member adapted for holding a group of rear lenses $L_3$ to $L_6$ and rearwardly moving lenses $L_3$–$L_6$ in the axial direction, and which engages at its projecting portion 8a, the tubular member 2b of the zoom operation ring 2a.

The tubular member 2b, which is integrally formed with the zoom operation ring 2a, is a cam member adapted for moving the lens moving ring 7 and the rear lens holding frame 8 in the opposite directions along the optical axis. Two slanting slits (extending slantingly in relation to the axial direction) 2c and 2d, which are inclined by predetermined angles relative to the axial direction are formed in the peripheral surfaces of the tubular member 2b. The projecting portion 7a of the lens moving ring 7 and the projecting portion 8a of the rear lens holding frame 8 are respectively inserted into these two slits such as to be movable therein, and the projecting portions 7a and 8a act as cam followers in relation to the tubular member 2b.

As the zoom operation ring 2a is turned by hand, the tubular member 2b is also turned to move the projecting portions 7a and 8a in the slanting slits 2c and 2d. The lens moving ring 7 and the rear lens holding frame 8, which are inhibited from being turned by the axial slits 1d and 1e of the fixed inner tube 1b, are moved in the axial direction in accordance with the turning movement of the tubular member 2b, and the lens moving ring 7 is moved forward to an extent no greater than the length of the slit 1d, while the rear lens holding frame 8 is moved backward to an extent no greater than the length of the slit 1e.

The front lens holding frame 6 is mounted in such a manner as to be capable of moving in the axial direction relative to the focusing ring 5, but incapable of moving by itself. That is, the front lens holding frame 6 cannot turn relative to the focusing ring 5, since an axial groove 5c, into which a projection 6b formed in the outer peripheral surface of the front lens holding frame 6 is inserted is formed in the inner peripheral surface of the focusing ring 5. On the other hand, the threaded portion 6a, formed on the outer periphery of the front lens holding frame 6, is screwed onto and engaged with the threaded portion 7b of the lens moving ring 7, which is movable solely in the substantially axial direction. Hence, the front lens holding frame 6 can move in the axial direction in the focusing ring 5 while turning integrally with the focusing ring 5.

The focusing ring 5 is a driving power transmitting member which is adapted for moving the front lens holding frame 6 to effect an autofocusing operation while being turned by the gear 12 through means of a tooth 5d, which is formed in the outer peripheral surface of the focusing ring 5 and which is constantly meshed with the gear 12.

The focusing ring 5 has a threaded portion 5a which is formed in the inner peripheral surface of a rear portion of the focusing ring 5 and which is screwed onto a threaded portion 1a formed in the outer peripheral surface of a front end portion of the fixed inner tube 1b. Therefore, when the focusing ring 5 is turned by the gear 12, the focusing ring 5 turns while moving in the axial direction relative to the fixed inner tube 1b and transmits a turning force to the front lens holding frame 6 through the engagement between the projection 6b and the axial groove 5e.

A connection terminal 9 (assumed here to represent a plurality of terminals) is provided which transmits power and control signals to the motor 10 and which is arranged in such a manner as to contact a connection terminal disposed on the camera body to connect the power source and the control circuit in the camera body to the motor 10 when the lens barrel is mounted on the camera body (not shown).

When the lens barrel in accordance with the present invention is used by being mounted on the camera body, a mounting click 1c is mounted on the mount of the camera body (not shown) so as to integrally connect the lens barrel to the camera body. After the lens barrel has been mounted, the terminal 9 is in contact with the terminal on the camera body, so that the power source in the camera body is connected to the motor 10 and various control circuits in the camera body, for instance, a distance metering circuit, are connected to the motor 10 by way of the terminal 9, thereby actuating the autofocusing operation.

Figure 2:
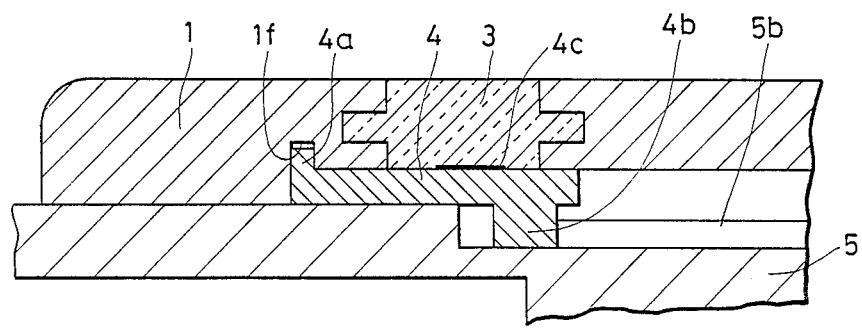
FIG. 2 is an enlarged view of the distance scale indicating construction shown in FIG. 1.

The state of the members disposed in the lens barrel immediately after the lens barrel has been mounted on the camera body in the above-described manner is that the group of front lenses $L_1$ and $L_2$ are in the position closest to that of the group of rear lenses $L_3$ to $L_6$, as shown in FIGS. 1 and 2. In this state, the image pick-up lens system displays the longest focal length such as to be most suitable for telephoto shots.

When the operator turns the zoom operation ring 2a in order to change the state of the lens system from that shown in FIGS. 1 and 2 to that suitable for short-focal-length shots (wideangle shots), the tubular member 2b which is integral with the zoom operation ring 2a is turned, and the projecting portions 7a and 8a, which have been inserted into slanting slits 2c and 2d of the tubular member 2b, are moved in these slits 2c and 2d. The lens moving ring 7 advances while being guided in the axial slit 1d of the fixed inner tube 1b. On the other hand, the rear lens holding frame 8 retreats while being guided in the axial slit 1e of the fixed inner tube 1b. When the lens moving ring moves forward, the front lens holding frame 6 and the group of front lenses $L_1$ and $L_2$ are also moved in the forward direction, since the lens moving ring 7 is engaged at its threaded portion 7b with the threaded portion 6a of the front lens holding frame 6. The distance between the group of front lenses $L_1$ and $L_2$ and the group of rear lenses $L_3$ to $L_6$ is thereby increased so that the focal length of image pick-up system is greatly reduced, thereby enabling the taking of wideangle shots.

In this case, the front lens holding frame 6 advances without turning the focusing ring 5 since the projection 6b formed on the front lens holding frame 6 has been inserted into the axial groove 5c formed in the inner peripheral surface of the focusing ring 5. At this time, there is no movement of the focusing ring 5 in the axial direction so that the meshing engagement between the gear 12 and the tooth 5d of the focusing ring 5 is maintained.

When a release button on the camera body is operated for taking a picture, the distance metering is automatically effected by a distance metering device incorporated in the camera body. Simultaneously, a focusing movement value is calculated by a control circuit in the camera body, and a control signal based on the results of this calculation is supplied from the camera body to the motor 10 by way of the terminal 9. Accordingly, when the motor 10 is turned on in accordance with the control signal, the turning movement thereof is transmitted to the driving shaft 13 and to the gear 12, after reducing the speed of the turning movement by means of the speed reduction mechanism 11, thereby turning the focusing ring 5 through the meshing engagement between the gear 12 and the tooth 5d of the focusing ring 5.

When the focusing ring 5 is turned, the front lens holding frame 6, which is supported such as to be rotatable with the focusing ring 5, turns integrally therewith. Since the threaded portion 6a of this holding frame 6 is screwed onto the threaded portion 7b of the lens moving ring 7 and since the lens moving ring 7 is supported by the tubular member 2b of the zoom operation ring such as to be inhibited from moving in the axial direction, the turning movement transmitted from the focusing ring 5 to the front lens holding frame 6 is converted, by the effect of the meshing engagement between the threaded portions 6a and 7b, into movement of the holding frame 6 in the axial direction, thereby moving the front lens holding frame 6 in the axial direction to an extent in proportion to that of the turning movement of the focusing ring 5. The front lenses $L_1$ and $L_2$ are thereby moved in the axial direction to an extent corresponding to the focusing movement value calculated by the control circuit, thus effecting automatic focusing. At the same time, the scale ring 4, which is rotatable with the focusing ring 5, is also turned, so that the distance scale 4c formed in the outer peripheral surface of the scale ring 4 displays the distance corresponding to the amount of turning movement of the focusing ring 5 in the distance scale indication window 3.

On the other hand, when the focusing ring 5 is turned, the focusing ring 5 is also moved in the axial direction by the effect of the engagement between the threaded portion 5a formed in the inner peripheral surface of the focusing ring 5 and the threaded portion 1a formed in the outer peripheral surface of the front end portion of the fixed inner tube 1b.

Since in this lens barrel the tooth 5d is provided in a spiral form, in order to prevent disengagement between the tooth 5d and the gear 12, the tooth 5d and the gear 12 are constantly meshed with each other even when the focusing ring 5 is moved in the axial direction. Otherwise, the tooth 5d may be elongated in the axial direction so as to tolerate axial movement of the focusing ring 5.

On the other hand, the scale ring 4 is not moved in the axial direction by the axial movement of the focusing ring 5 while only turning below the distance scale indication window 3, even when the focusing ring 5 is moved in the axial direction, because the projecting portion 4b of the scale ring 4 is in engagement with the axial groove 5b of the focusing ring 5. Therefore, the distance scale 4c appearing in the distance scale indication window 3 does not move in the axial direction while the focusing ring 5 is moving in the axial direction.

As described above, in the lens barrel in accordance with the present invention, a scale ring 4 which is capable of turning but incapable of moving in the axial direction is disposed between the fixed outer tube 1 and the focusing ring 5, so that, even when the focusing ring 5 is turned, the distance scale 4c which appears in the distance indication window 3 does not move in the axial direction, thereby making the distance scale 4c easy to see. In addition, it is possible to minimize the size of the distance scale indication window 3 since the distance scale 4c does not move in the axial direction. Accordingly, it is possible to minimize the size of a lens or glass disposed in the window 3, thereby reducing the risk of damaging this lens or glass while preventing reduction in the mechanical stiffness of the fixed outer tube 1.

We claim:

1. A lens barrel comprising:
    a fixed outer tube having a cylindrical shape;
    an indication window arranged in the outer peripheral surface of said fixed outer tube;
    a focusing ring, disposed inward of the inner periphery of said fixed outer tube, movable in the direction of an optical axis, and rotatable about said optical axis;
    a motor disposed radially inward of the inner peripheral surface of said fixed outer tube for driving said focusing ring;
    a distance scale ring disposed inward of the inner periphery of said indication window and only rotatable about said optical axis, said distance scale ring having distance scale marks formed over its outer peripheral surface; and
    an interconnecting mechanism interconnecting said focusing ring with said distance scale ring, said interconnecting mechanism being constructed and arranged to rotate said distance scale ring in response to the rotation of said focusing ring about said optical axis without moving said distance scale ring in the direction of said optical axis.

2. A lens barrel according to claim 1 wherein said interconnecting mechanism comprises a slit formed in said focusing ring so as to extend in the direction of said optical axis, and a projection formed on said distance scale ring inserted into said slit of said focusing ring.

3. A lens barrel according to claim 1, further comprising:
    focusing means for moving said focusing ring in the direction of said optical axis while rotating said focusing ring about said optical axis.

4. A lens barrel according to claim 3, further comprising a power wheel, driven by said motor, and a fixed member fixed to said fixed outer tube, wherein said focusing ring comprises a first threaded portion and said fixed member comprises a second threaded portion engaging said first threaded portion of said focusing ring, wherein said focusing means rotates said focusing ring about said optical axis in response to the rotation of said power wheel and moves said focusing ring in the direction of said optical axis by the effect of the engagement between said first threaded portion formed on said focusing ring and said second threaded portion formed on said fixed member.

5. A lens barrel according to claim 4 wherein said fixed member comprises a tube fixed with respect to and positioned inside said fixed outer tube.

6. A lens barrel according to claim 1, wherein said interconnecting mechanism is disposed radially inward of the inner peripheral surface of said fixed outer tube at substantially the same distance from said optical axis as said motor.

7. A lens barrel comprising:
  a fixed outer tube comprising an outer peripheral surface and a channel in said outer peripheral surface;
  a rotatable inner tube positioned inside said outer tube, wherein said rotatable inner tube comprises a zoom operation ring positioned in said channel in said outer peripheral surface of said outer tube;
  a front lens moving means for moving lenses positioned at the front of said lens barrel, wherein said front lens moving means engages said rotatable inner tube and is adapted for axial movement in the direction of an optical axis;
  a rear lens holding means engaging said rotatable inner tube and adapted for axial movement in the direction of said optical axis, wherein said front lens moving means and said rear lens holding means are displaced in opposite directions in the direction of said optical axis in response to the rotation of said rotatable inner tube;
  an indication window arranged in the outer peripheral surface of said fixed outer tube;
  a focusing ring, disposed inward of the inner periphery of said fixed outer tube, movable in the direction of said optical axis, and rotatable about said optical axis;
  a distance scale ring disposed inward of the inner periphery of said indication window and only rotatable about said optical axis, said distance scale ring having distance scale marks formed over its outer peripheral surface; and
  an interconnecting mechanism interconnecting said focusing ring with said distance scale ring, said interconnecting mechanism being constructed and arranged to rotate said distance scale ring in response to the rotation of said focusing ring about said optical axis without moving said distance scale ring in the direction of said optical axis.

8. A lens barrel according to claim 7 wherein said rotatable inner tube comprises first and second slits slanted with respect to said optical axis and adapted to receive a portion of said front lens moving means and said rear lens holding means, respectively.

9. A lens barrel according to claim 8 wherein said front lens moving means comprises:
  a lens moving ring displaced in an opposite direction from said rear lens holding means in the direction of said optical axis in response to the rotation of said rotatable inner tube, wherein said lens moving ring comprises a threaded portion; and
  a front lens group holding frame comprising a threaded portion engaging said threaded portion of said lens moving ring, wherein said front lens group holding frame is mounted inside said focusing ring so as to be rotatable with said focusing ring and displaceable in the direction of said optical axis with respect to said focusing ring, wherein said front lens group holding frame is moved in the direction of said optical axis in response to the movement of said lens moving ring in the direction of said optical axis without rotating said focusing ring.

10. A lens barrel according to claim 8 further comprising a fixed inner tube, fixed with respect to said fixed outer tube, wherein said front lens moving means is attached to said fixed inner tube so as to be prevented from rotating in response to the rotation of said focusing ring, whereby the rotation of said focusing ring rotates said front lens group holding frame and moves said front lens group holding frame in the direction of said optical axis in proportion to the rotation of said focusing ring.

* * * * *